A. NOBLE.
BROODER.
APPLICATION FILED APR. 2, 1909.
934,206.
Patented Sept. 14, 1909.
3 SHEETS—SHEET 1.
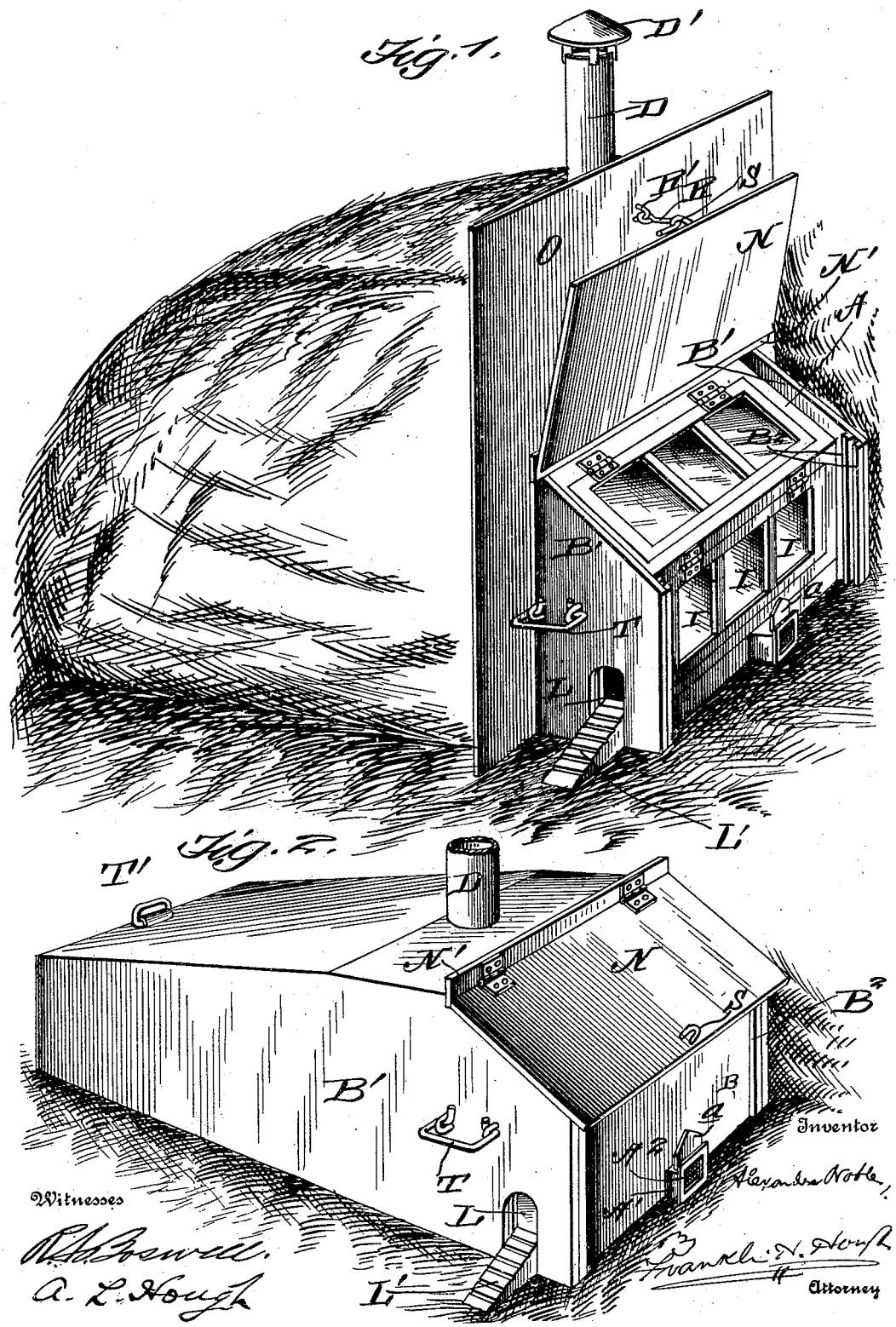

A. NOBLE.
BROODER.
APPLICATION FILED APR. 2, 1909.
934,206.
Patented Sept. 14, 1909.
3 SHEETS—SHEET 2.
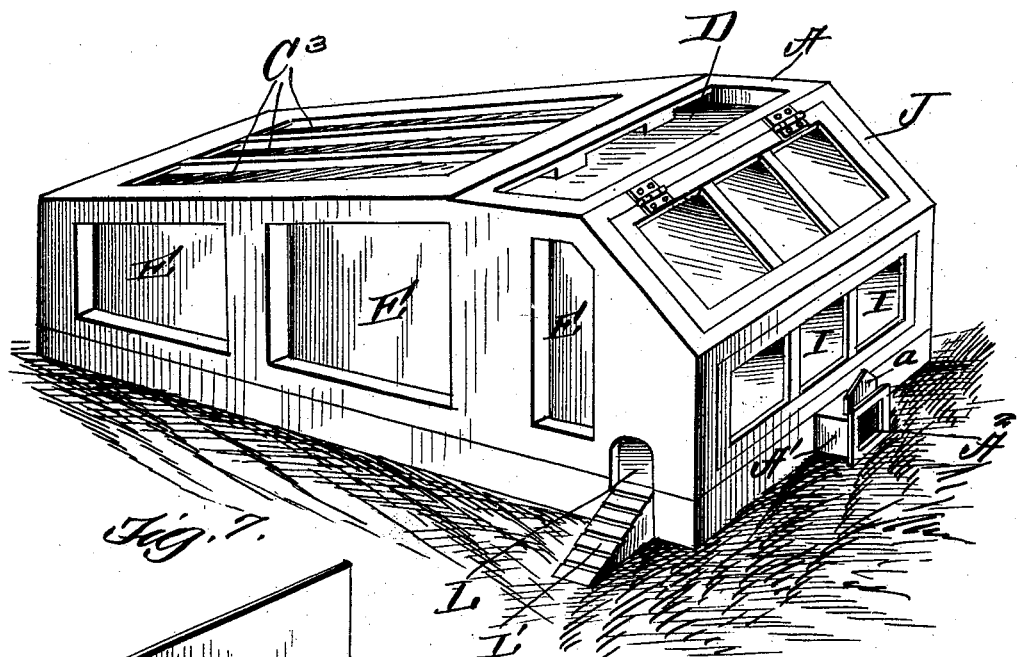
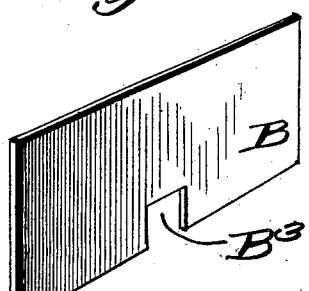
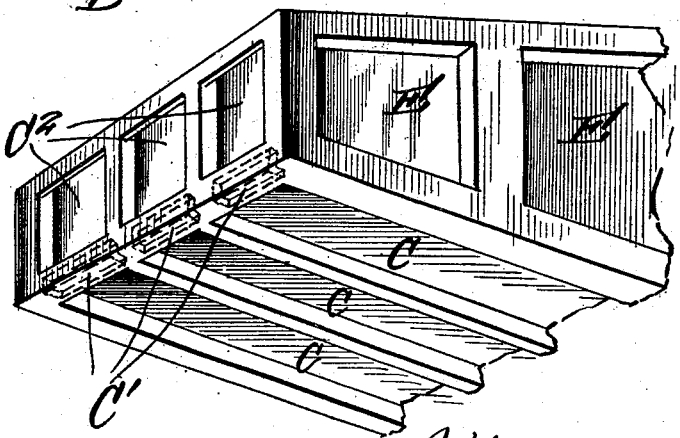
Witnesses
Inventor
Alexander Noble,
By Franklin N. Hough
Attorney A. NOBLE.
BROODER.
APPLICATION FILED APR. 2, 1909.
934,206.
Patented Sept. 14, 1909.
3 SHEETS—SHEET 3.
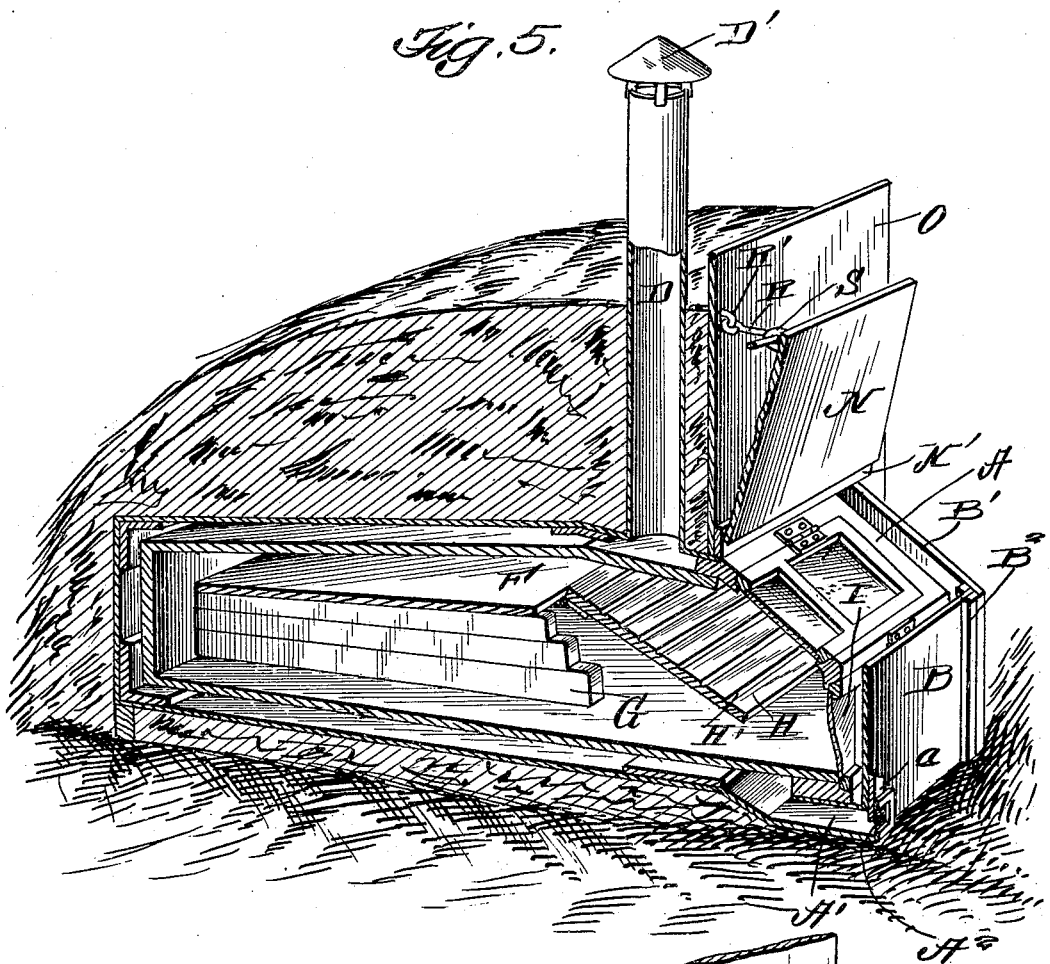
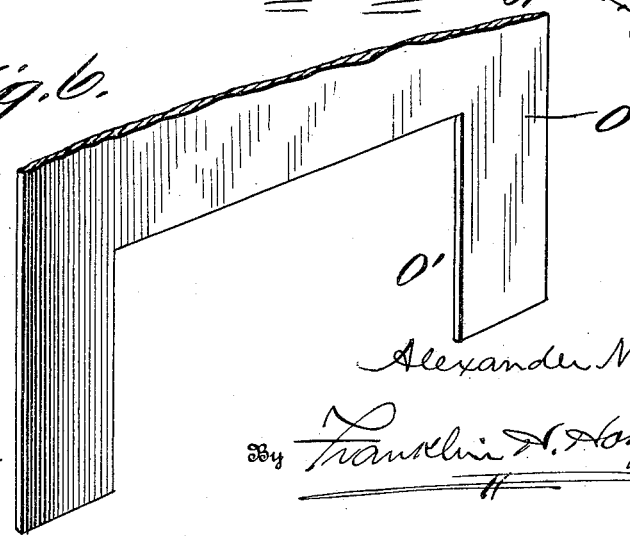

UNITED STATES PATENT OFFICE.

ALEXANDER NOBLE, OF ROCK SPRINGS, WYOMING.

BROODER.

934,206.

Specification of Letters Patent. Patented Sept. 14, 1909.

Application filed April 2, 1909. Serial No. 487,446.

*To all whom it may concern:*

Be it known that I, ALEXANDER NOBLE, a citizen of the United States, residing at Rock Springs, in the county of Sweetwater and State of Wyoming, have invented certain new and useful Improvements in Brooders; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to new and useful improvements in brooders and comprises various details of construction, combinations and arrangements of parts which will be hereinafter fully described and then specifically defined in the appended claim.

My invention is illustrated in the accompanying drawings, in which:—

Figure 1 is a perspective view of my improved brooder shown covered with a material from the decomposition of which heat is produced. Fig. 2 is a perspective view of the brooder with an outer covering or shell thereto. Fig. 3 is a perspective view showing the brooder with the outer covering removed. Fig. 4 is an enlarged detail perspective view of the rear portion of the brooder showing the ducts or flues for the circulation of air. Fig. 5 is a detail sectional perspective view through the form shown in Fig. 1. Fig. 6 is a detail perspective of a guard plate for holding the covering material from contact with the front portion of the brooder, and Fig. 7 is a detail perspective view of a slide forming the front wall of the outer shell or casing.

Reference now being had to the details of the drawings by letter, A designates the wall of a brooder about which projects a flue A' having a gauze covering $A^2$ therein to prevent foreign matter passing therethrough and also a slide $a$ to regulate the air passing therethrough. Said flue passes through the removable front wall B of the outer casing, designated by letter B', said wall B being held between the cleats $B^2$ and provided with a recess $B^3$ in its lower end, as shown clearly in Fig. 7 of the drawings, adapted to fit over the flue A'.

Referring to Fig. 5 of the drawings, it will be noted that a space intervenes between the inner surface of the outer casing and the outer surface of the brooder proper, said flue A' leading to said space underneath the brooder and, by reference to Fig. 4, it will be noted that the under surface of the brooder is provided with flues C which communicate through the passageways C' with flues $C^2$ formed in the face of the rear wall of the brooder. Said flues $C^2$ communicate with the flues $C^3$, shown in Fig. 3 of the drawings, which open into the transverse recess $d$ formed in the top of the brooder and over said recess $d$ is an opening in the top of the outer shell or casing from which a pipe D rises, which latter is provided with a deflecting cap D' to prevent rain, snow and other foreign matter from entering the same.

The sides of the brooder are provided with dead air spaces, designated by letters E, E. Mounted within the brooder is a platform F held adjustably in different positions by means of the super-imposed strips G which are removably held therein, and H designates a bridge with cleats H' thereon, said bridge being hinged to the platform F and affording means up and down which the chickens may conveniently pass. The front wall of the brooder is provided with a window I, shown in Figs. 3 and 5 of the drawings, and the inclined wall adjacent to the front of the brooder is provided with a hinged window J giving sufficient light to the interior thereof, and L designates an opening in the side wall of the brooder and L' a bridge leading up thereto.

The casing or shell B' is provided with a door N which is hinged to the upright flange N' of the casing and is adapted to close the opening in the shell which registers with the opening over the inclined portion of the brooder.

O designates a guard plate, an enlarged detail view of which is shown in Fig. 6 of the drawings, said plate being recessed at O' and adapted to fit over the top of the shell and extend down the sides thereof in the manner shown in Fig. 1 of the drawings and serves as a means for preventing the material covering the casing from falling forward through the openings in the shell and brooder. A hook R is connected to an eye R' upon said plate O and is adapted to engage an eye S upon the door N, whereby the latter may be held open.

Handles T and T' are fastened respectively to the side and top of the casing and afford means whereby the casing may be moved.

From the foregoing, it will be noted that, by the provision of a brooder made as shown and described, means is afforded whereby the shell with the brooder therein may be covered with material from the decomposition of which heat is produced for the purpose of heating the interior of the brooder or, in the event of the weather being such as not to require other heat than the normal heat of the atmosphere, the covering of the material, the decomposition of which produces heat by chemical action, may be dispensed with. By the closing of the door of the casing or shell, the contents of the brooder may be protected. In the event of it being desired to remove the brooder from the casing, it may be easily done by simply removing the front wall B from the shell which will allow the brooder to be withdrawn from the casing.

What I claim to be new is:—

A brooder having flues formed in the rear wall and top thereof and leading to an opening in said top, a casing within which said brooder is mounted with spaces intervening between the inner walls of the latter and said brooder, a flue leading into the space underneath the brooder, a pipe leading from said space above the brooder and through the top wall of the casing, an adjustable platform within the brooder, a bridge hinged thereto, the forward end of said brooder having an opening, a window hinged to the marginal edge thereof, said casing provided with an opening registering with said window, a flange rising from the upper marginal edge of said registering opening over the window, a guard plate recessed upon its under edge and fitting over said casing and extending down the sides of the latter and against said flange, as set forth.

In testimony whereof I hereunto affix my signature in the presence of two witnesses.

ALEXANDER NOBLE.

Witnesses:
  Jno. L. Dykes,
  Geo. L. Bleck.